United States Patent [19]

Maekawa et al.

[11] Patent Number: 4,953,910
[45] Date of Patent: Sep. 4, 1990

[54] OPENABLE ROOF CONTROL DEVICE OF WHEELED MOTOR VEHICLE

[75] Inventors: Junichi Maekawa, Yokohama; Masanori Abe, Ayse; Hirofumi Ienaga, Kawasaki; Shigeaki Hashimoto, Chigasaki, all of Japan

[73] Assignees: Nissan Motor Co., Ltd.; Ohi Seisakusho Co., Ltd., both of Japan

[21] Appl. No.: 260,127

[22] Filed: Oct. 18, 1988

[30] Foreign Application Priority Data

Oct. 19, 1987 [JP] Japan .................. 62-261735
Oct. 19, 1987 [JP] Japan .................. 62-261736
Oct. 19, 1987 [JP] Japan .................. 62-158815

[51] Int. Cl.$^5$ ............................ B60J 7/057
[52] U.S. Cl. ................................ 296/223
[58] Field of Search ................ 296/223, 224

[56] References Cited

U.S. PATENT DOCUMENTS 3,031,226  4/1962  Larche ...................... 296/223
4,468,063  8/1984  Yukimoto et al. ....... 296/223

FOREIGN PATENT DOCUMENTS

62-101528  5/1987  Japan .
62-157825  7/1987  Japan .
62-163822  7/1987  Japan .

Primary Examiner—Charles A. Marmor
Assistant Examiner—Richard Camby
Attorney, Agent, or Firm—Lowe, Price, LeBlanc, Becker & Shur

[57] ABSTRACT

A control device for controlling the operation of an openable roof of a wheeled motor vehicle. The device comprises three slide mechanisms arranged on mutually spaced portions of the body of the vehicle, each slide mechanism including a carrier device which carries thereon the openable roof for moving the openable roof between a full close position and a full open position; three electric actuators which are respectively connected to the three slide mechanisms for moving, when electrically energized, the carrier devices between positions corresponding to the full closed position of the openable roof and the other positions corresponding to the full open position of the openable roof. Latch assemblies are provided for latching at least two of the carrier devices relative to the vehicle body when the openable roof comes to one of the full close and full open positions. The operation of three electric actuators are controlled to function together to open and close the openable roof.

20 Claims, 12 Drawing Sheets

OPENABLE ROOF CONTROL DEVICE OF WHEELED MOTOR VEHICLE

BACKGROUND OF THE INVENTION

1. Field of the Invention

The present invention relates in general to wheeled motor vehicles, and particularly to wheeled motor vehicles of a type which is equipped with an openable roof. More specifically, the present invention is concerned with a control device which controls the opening and closing movement of the roof relative to the vehicle body.

2. Description of the Prior Art

Hitherto, various types of openable roof control devices have been proposed and put into practical use. One of them is disclosed in Japanese Patent First Provisional Publication No. 62-101528, which is of a type using hinges for pivoting the openable roof between an open position and a closed position. However, due to their inherent constructions, some of them including the device of this publication fail to obtain stable and reliable operation thereof and ease with which the device is manipulated.

SUMMARY OF THE INVENTION

It is therefore an object of the present invention to provide an openable roof control device of a wheeled motor vehicle, which is free of the above-mentioned drawbacks.

According to the present invention, there is provided an openable roof control device of a wheeled motor vehicle, which comprises three sliding mechanisms which are arranged on mutually spaced portions of a vehicle body to smoothly slide the openable roof between a full close position and a full open position.

According to the present invention, there is provided, in a wheeled motor vehicle having a slidably openable roof on a roof construction, an improved openable roof control device for controlling operation of the openable roof. The control device comprises three slide mechanisms arranged on mutually spaced portions of the body of the vehicle, each slide mechanism including a carrier device which carries thereon the openable roof for moving the openable roof between a full close position and a full open position; three electric actuators which are respectively connected to the three slide mechanisms for moving, when electrically energized, the carrier devices between positions corresponding to the full close position of the openable roof and the other positions corresponding to the full open position of the openable roof; latch means for latching at least two of the carrier devices relative to the vehicle body when the openable roof comes to one of the full close and full open positions; and control means for controlling operation of the three electric actuators.

According to the present invention, there is further provided, in a wheeled motor vehicle having slidably openable roof on a roof construction, an openable roof control device which comprises a pair of side slide mechanisms respectively mounted to laterally opposed sides of the body of the motor vehicle, each side slide mechanism including a first guide member which is secured to the side of the body to extend along a longitudinal axis of the vehicle, a first carrier device which is movable along the guide member between first and second given positions and is detachably connected to a portion of the openable roof, first means which latchingly engages the carrier device relative to the guide member when the carrier device comes to the first given position, and second means which latchingly engages the carrier device relative to the guide member when the carrier device comes to the second given position; an upper slide mechanism mounted on the roof construction of the vehicle, the upper mechanism including a second guide member which is secured to the roof construction to extend along the longitudinal axis of the vehicle, and a second carrier device which is movable along the second guide member and is detachably connected to another portion of the openable roof; a first electric actuator for moving the first carrier device of each side slide mechanism along the first guide member between the first and second given positions upon energization; a second electric actuator for moving the second carrier device of the upper slide mechanism along the second guide member upon energization; and control means for controlling operation of the first and second electric actuators.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, an openable roof control device of the present invention will be described with reference to the accompanying drawings.

Figure 1:
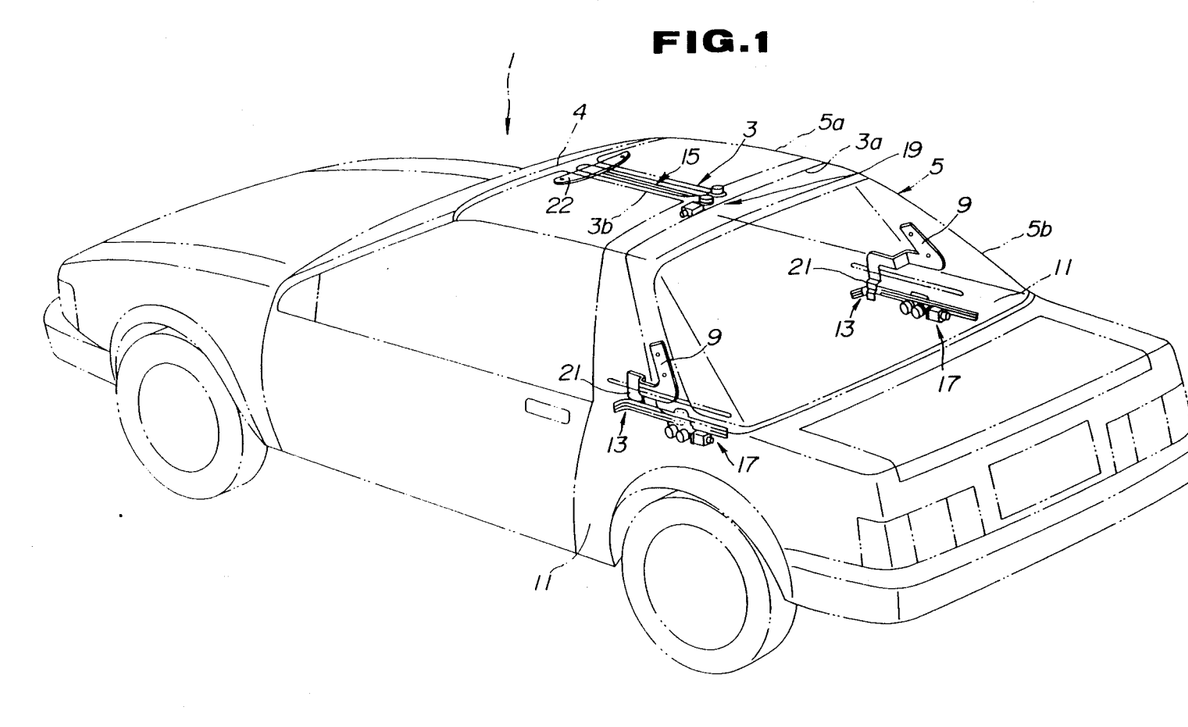
FIG. 1 is a perspective view of a wheeled motor vehicle to which an openable roof control device of the present invention is practically applied.

FIG. 1 shows a two-door type wheeled motor vehicle 1 to which the present invention is practically applied. The motor vehicle 1 has a so-called "T-bar roof" construction 3 which generally comprises a laterally extending reinforcing beam 3a which straddles side bodies 11 and 11 and a center beam 3b which extends from a middle portion of the lateral beam 3a to an upper center of a windshield 4 of the vehicle. An openable roof 5 is slidably mounted on the T-bar roof construction 3 in such a manner as will be described in the following.

Figure 20:
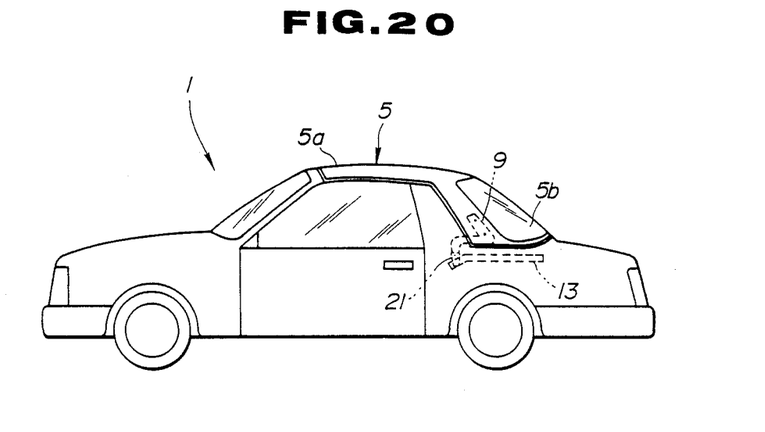
FIG. 20 is a side view of the wheeled motor vehicle to which the present invention is practically applied, showing a condition wherein an openable roof is in its full close position.

The openable roof 5 comprises a roof proper part 5a and a rear window part 5b which are united together as is well seen from FIG. 20. As will be understood from FIG. 14, the openable roof 5 has along its peripheral edge a weather strip 7 which, upon full closing of the roof 5, is sealingly pressed against a peripheral edge of a roof opening defined by the vehicle body.

As is best seen from FIG. 1, two mounting brackets 9 and 9 are secured to inner surfaces of both sides of the openable roof 5, respectively. As is seen from FIG. 4, each bracket 9 is formed with a plurality of mounting openings 9a at a lower portion thereof.

Two guide members 13 and 13 are secured to the inner surfaces of the respective side bodies 11 and 11 in a manner to extend along a longitudinal axis of the vehicle 1, and another guide member 15 is mounted on the center beam 3b of the T-bar roof construction 3 in a manner to extend along the vehicle axis. As will be described in detail hereinafter, each guide member 13 or 15 carries thereon a slidable carrier plate 21 or 22 which is driven forward and rearward by a drive means 17 or 19.

Right and left side slide mechanisms are thus constituted each comprising the guide member 13, the carrier plate 21 and the drive means 17, and an upper slide mechanism is constituted which generally comprises the guide member 15, the carrier plate 22 and the drive means 19.

Since the right and left side slide mechanisms are substantially the same in construction except the orientation in which they are arranged, the following description will be directed to only the left side mechanism for simplification of the description.

Figure 8:
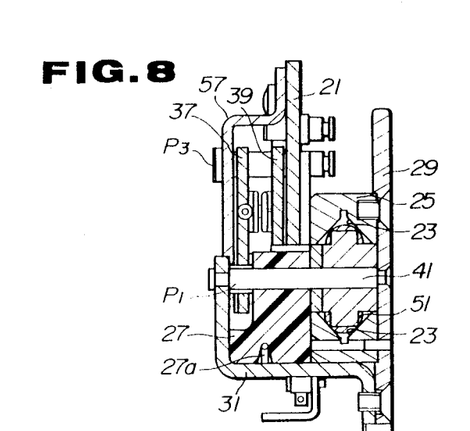
FIG. 8 is a sectional view taken along the line VIII—VIII of FIG. 4.
Figure 9:
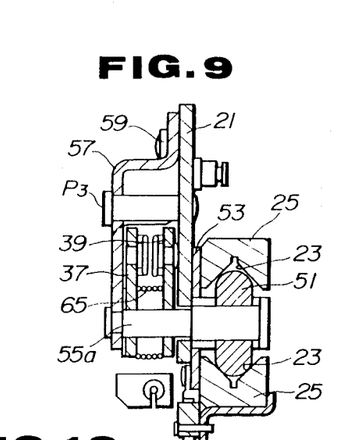
FIG. 9 is a sectional view taken along the line IX—IX of FIG. 4.
Figure 10:
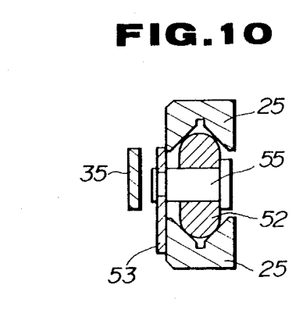
FIG. 10 is a sectional view taken along the line X—X of FIG. 4.
Figure 11:
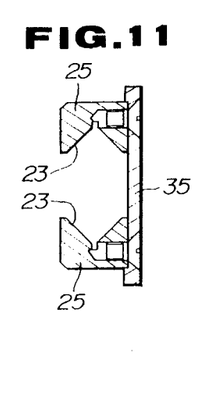
FIG. 11 is a sectional view taken along the line XI—XI of FIG. 4.
Figure 12:
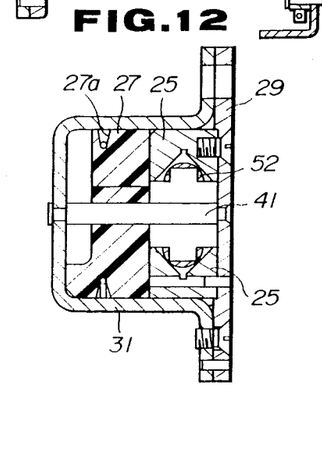
FIG. 12 is a sectional view taken along the line XII—XII of FIG. 4.

The guide member 13 secured to the left side body 11 comprises paired upper and lower guide rails 25 and 25 as is seen from FIG. 11. The rails 25 and 25 have at their facing portions guide grooves 23 and 23 of generally V-shaped cross section. As will be understood from FIG. 4, a front part of the guide member 13 is smoothly inclined downward. Thus, the guide member 13 comprises a horizontally extending major part and a downwardly inclined front part. The front and rear ends of the paired rails 25 and 25 (viz., the front and rear ends of the guide member 13) are each held by a base plate 29 and a holding plate 31 (see FIG. 13). As is seen from FIGS. 8 and 12, these plates 29 and 31 are secured to each other by means of connecting pins 41. The base plate 29 and the holding plate 31 at each end of the guide member 13 hold therebetween a guide body 27 of a plastic which has a wire guide groove 27a formed therethrough. As is seen from FIG. 19, the base plates 29 and 29 are secured to an inner panel 33 of a rear-left wheel house of the vehicle. As is understood from FIGS. 4 and 11, a connecting plate 35 is bolted to both the paired upper and lower rails 25 and 25 at the junction partions each being defined between the inclined front part of the guide member 13 and the horizontal major part of the same.

Figure 4:
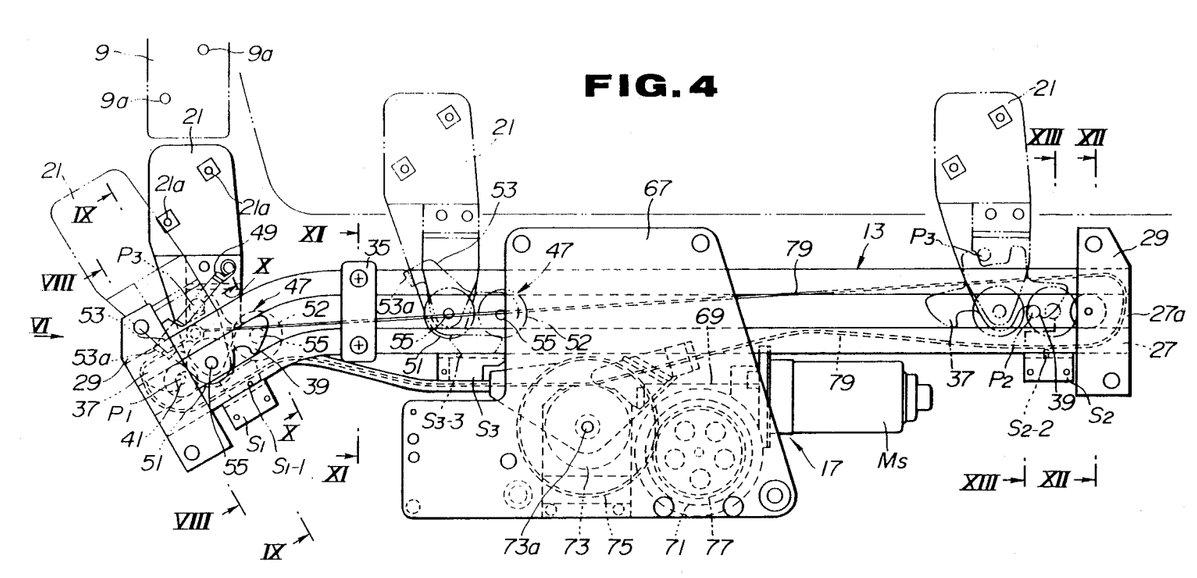
FIG. 4 is a side view of one of paired side slide mechanisms employed in the control device of the invention.
Figure 5:
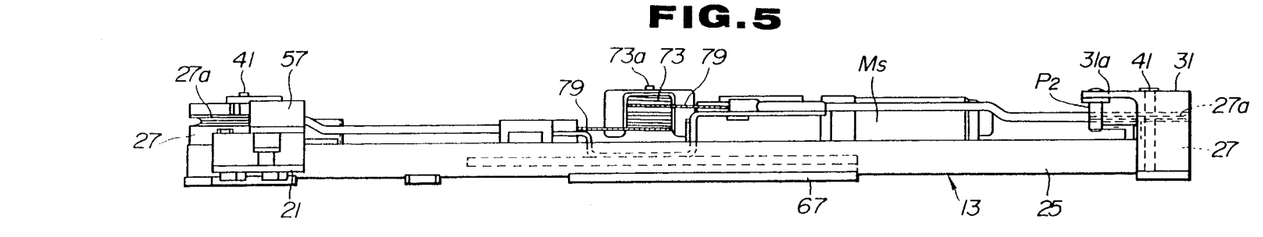
FIG. 5 is a plan view of the side slide mechanism of FIG. 4.

As is seen from FIGS. 4 and 5, the guide member 13 is equipped at its front and rear ends with first and second engaging pins $P_1$ and $P_2$ which are engageable with after-mentioned first and second latch members 37 and 39. The first engaging pin $P_1$ has an extended part 41 by which the front base plate 29 and the front holding plate 31 are secured. Thus, the extended part 41 serves as a fixing pin for the plates 29 and 31. As is seen from FIG. 5, the second engaging pin $P_2$ is secured to a forwardly extending part 31a of the rear holding plate 31.

Figure 19:
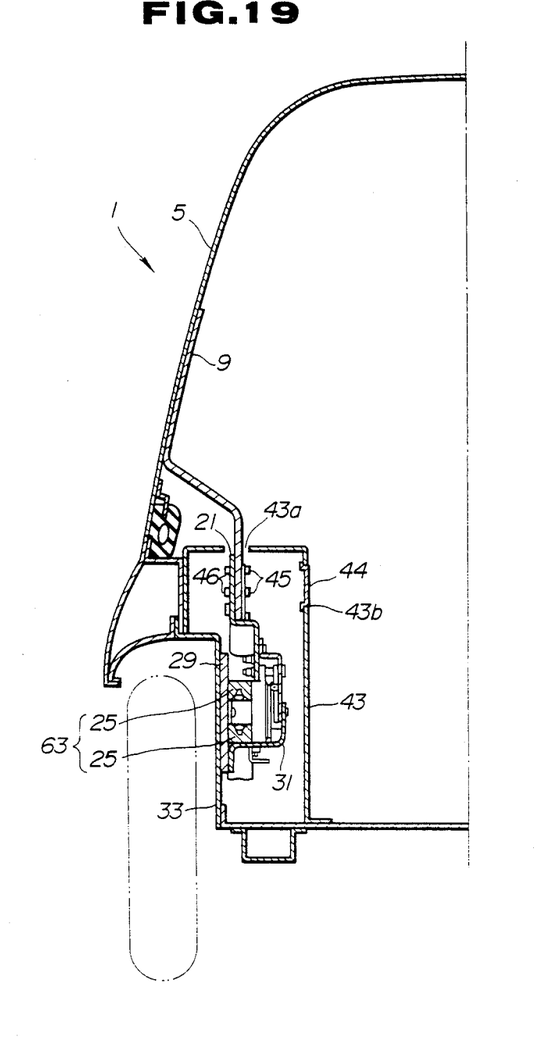
FIG. 19 is a laterally sectional but partial view of the vehicle at the position where the side slide mechanism is located.

As is seen from FIG. 19, the essential part of the side slide mechanism is housed in a housing 43 which is located beside a rear-left wheel housing of the vehicle 1. The housing 43 is formed at its upper part with an elongate opening 43a which extends along the axis of the vehicle 1 and at its inside wall with an opening 43b which is plugged with a lid 44.

The afore-mentioned mounting bracket 9 of the openable roof 5 has a lower part inserted into the housing 43 through the elongate opening 43a.

The carrier plate 21 is located within the housing 43 and secured to the lower part of the mounting bracket 9 by means of bolts 45 and nuts 46. For this bolt connection, the lower part of the mounting bracket 9 and the carrier plate 21 have matable bolt holes 9a and 21a respectively as is seen from FIG. 4. It is to be noted that the opening 43b for the lid 44 is positioned near the bolted portion of the carrier plate 21 and an after-mentioned third detecting switch $S_3$ for the purpose which will become apparent as the description proceeds.

As is seen from FIG. 4, the carrier plate 21 has a base portion supported by a roller device 47 and is constantly biased by a biasing spring 49 to pivot forwardly, that is, in a counterclockwise direction in this drawing.

Figure 6:
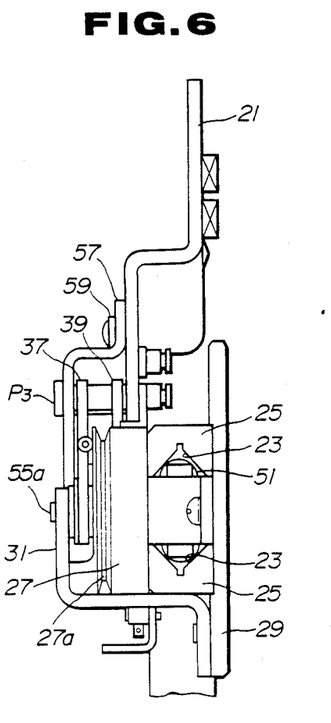
FIG. 6 is a front view of a guide member, which view is taken from the direction of the arrow "VI" of FIG. 4.
Figure 7:
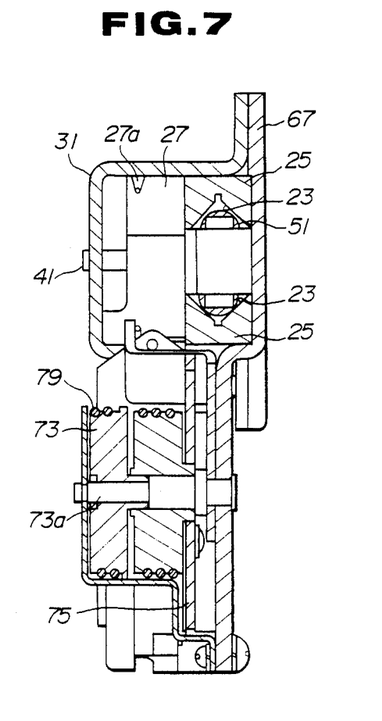
FIG. 7 is a sectional view of a portion of the side slide mechanism where a wire winding drum is located.

The roller device 47 comprises first and second rollers 51 and 52 which run along the guide groove 23 of the lower rail 25 of the guide member 13. As is seen from FIG. 2, the first and second rollers 51 and 52 are rotatably connected through respective shafts 55 and 55 to a holding plate 53. The plate 53 has a front bent end 53a which serves as a stopper. The shaft 55 of the first roller 51 pierces the holding plate 53 and has an extended part 55a (see FIG. 6) pivotally connected to a base portion of the carrier plate 21. That is, the extended part 55a is journaled by a sub-plate 57 which is secured to the carrier plate 21 by means of rivets 59. With this, the movement of the first and second rollers 51 and 52 along the guide groove 23 is smoothly carried out without suffering undesired play.

Figure 2:
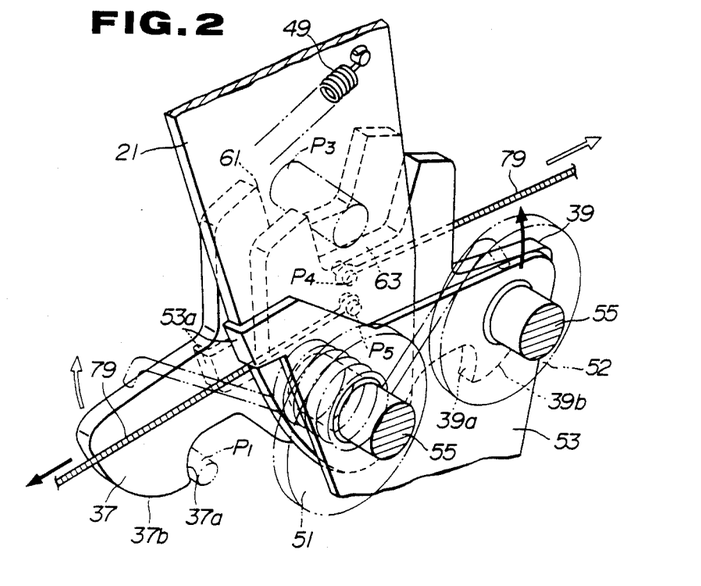
FIG. 2 is a perspective view of an essential portion of the control device of the present invention.

As is seen from FIG. 2, the stopper bent end 53a of the holding plate 53 is formed to suppress an excessive forward pivoting of the carrier plate 21. The carrier plate 21 is biased by a biasing spring 49 to contact with the stopper bent end 53a, so that the carrier plate 21 keeps its upright standing position during its movement along the guide member 13. This will be understood from FIG. 4 wherein exemplified three upright standing positions of the carrier plate 21 are illustrated. As is seen from the position of the carrier plate 21 illustrated by a solid line in the drawing, when the openable roof 5 is in its full close position, the carrier plate 21 is kept separated from the stopper bent end 53a against the biasing force of the spring 49 and keeps the upright standing position. This is because in this case the roller device 47 is located at the downwardly inclined front part of the guide member 13. Thus, if the openable roof 5 (more specifically, the mounting bracket 9) is dismounted from the carrier plate 21, the latter is forced to incline forward to the position as illusrated by a broken line wherein the plate 21 is in contact with the stopper bent end 53a.

For the purpose which will be described hereinafter, the carrier plate 21 is equipped with a stopper pin $P_3$.

Figure 3:
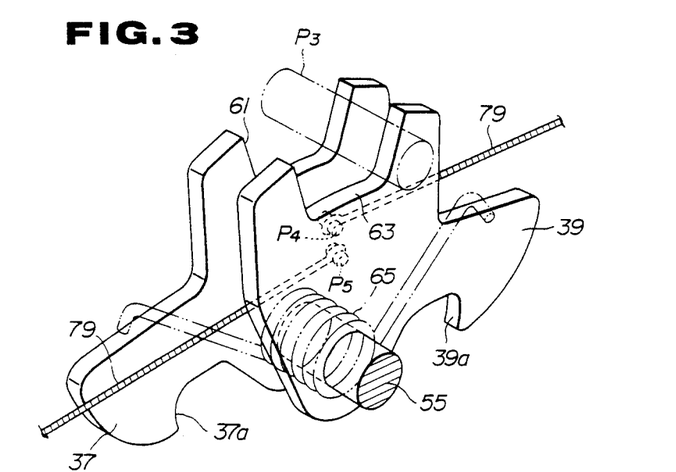
FIG. 3 is a view similar to FIG. 2, but some parts being removed.

As is well seen from FIG. 3, the extended part 55a of the shaft 55 of the first roller 51 pivotally mounts thereabout first and second latch members 37 and 39 which have respective hook portions 37a and 39a projected in opposite directions. The hook portions 37a and 39a of the latch members 37 and 39 are formed to be latchingly engageable with the afore-mentioned first and second engaging pins $P_1$ and $P_2$ of the guide member 13. The first and second latch members 37 and 39 are formed at their upper portions with identical recesses 61 and 63. The stopper pin $P_3$ of the carrier plate 21 is usually received in the resesses 61 and 63 as shown in FIG. 3. During rearward movement (viz., the rightward movement in FIG. 4) of the roller device 47, a left wall of the recess 61 of the first latch member 37 abuts on the stopper pin $P_3$ and thus presses against the carrier plate 21. While, during forward movement (viz., the leftward movement in FIG. 4) of the device 47, a right wall of the recess 63 of the second latch member 39 abuts on the stopper pin $P_3$ and thus presses against the carrier plate 21.

As is understood from FIG. 2 or FIG. 3, the hook portion 39a of the second latch member 39 is arranged behind the extended part 55a of the shaft 55 of the first roller 51, while the hook portion 37a of the first latch member 37 is arranged in front of the extended part 55a. Due to work of a biasing spring 65 disposed about the extended part 55a of the shaft 55, the first and second latch members 37 and 39 are biased in counterclockwise and clockwise directions respectively. When the openable roof 5 comes to its full close position, the hook portion 37a of the first latch member 37 is thus brought into latching engagement with the first engaging pin $P_1$ of the guide member 13. Thus, under this condition, forward and rearward movement of the openable roof 5 is assuredly suppressed.

It is to be noted that due to the engagement between the stopper pin $P_3$ and each of the recesses 61 and 63 of the first and second latch members 37 and 39, excessive pivoting of the latch members 37 and 39 is suppressed.

The electric motor $M_S$ (see FIG. 4) serving as the drive means 17 is of a reversable type. The motor $M_S$ is mounted on a base plate 67 which is secured to the inner panel 33 of the rear-left wheel housing (see FIG. 19). As is shown in FIG. 4, a worm 69 driven by the motor $M_S$ is meshed with a worm wheel 71 which is equipped with a drive gear 77. The drive gear 77 is meshed with a drum gear 75 of a wire winding drum 73. Thus, the wire winding drum 73 is rotated about its shaft 73a in one or the other direction in response to operation of the motor $M_S$.

A wire cable 79 is wound about the wire winding drum 73 having both ends released therefrom. One end of the wire cable 79 is passed through the wire guide groove 27a of the guide body 27 and connected to a mounting pin $P_4$ (see FIGS. 2 and 3) of the first latch member 37, while the other end of the wire cable 79 is passed through the guide groove 27a of the other guide body 27 and connected to a mounting pin $P_5$ of the second latch member 39 (see FIGS. 2 and 3). As is seen from FIG. 3, the mounting pins $P_4$ and $P_5$ on the first and second latch members 37 and 39 are located above the extended part 55a of the shaft 55 about which the first and second latch members 37 and 39 are rotatable. Thus, upon traction by the wire cable 79, these latch members 37 and 39 are pivoted upward about the shaft 55 thereby releasing the hook portions 37a and 39a thereof from the first and second engaging pins $P_1$ and $P_2$. When the latch member 37 (or 39) is pivoted in this manner, the left wall of the recess 61 of the first latch member 37 (or the right wall of the recess 63 of the second latch member 39) is brought into abutment with the stopper pin $P_3$ of the carrier plate 21.

Although not shown in the drawings, a manual switch is mounted in a suitable portion of the vehicle 1. That is, upon manipulation of the switch, the motor $M_S$ becomes energized.

As is seen from FIG. 4, first, second and third switches $S_1$, $S_2$ and $S_3$ are mounted on the guide member 13, which control the operation of the motor $M_S$.

The first switch $S_1$ is mounted on the front end of the guide member 13 and becomes OFF condition when the openable roof 5 is brought into its full close position. That is, upon full closing of the roof 5, the holding plate 53 moved with the carrier plate 21 strikes against a detecting bar $S_1$-1 of the switch $S_1$ thereby to cause OFF condition of the switch $S_1$. Thus, the detecting bar $S_1$-1 is placed on a travelling path described by the holding plate 53.

The second switch $S_2$ is mounted on the rear end of the guide member 13 and becomes OFF condition when the openable roof 5 is brought into its full open position. That is, upon full opening of the roof 5, the holding plate 53 moved with the carrier plate 21 strikes against a detecting bar $S_2$-2 of the switch $S_2$ thereby to cause OFF condition of the switch $S_2$. Thus, the detecting bar $S_2$-2 is placed on a travelling path described by the holding plate 53.

The third switch $S_3$ is mounted on the front end of the horizontal major part of the guide member 13 and becomes OFF condition when the openable roof 5 is brought into a given slight open position during its opening movement. That is, upon the openable roof 5 coming to the given slight open position, the holding plate 53 moved with the carrier plate 21 strikes against a detecting bar $S_3$-3 of the switch $S_3$ thereby to cause OFF condition of the switch $S_3$. Thus, the detecting bar $S_3$-3 is placed on a travelling path described by the holding plate 53.

Figure 13:
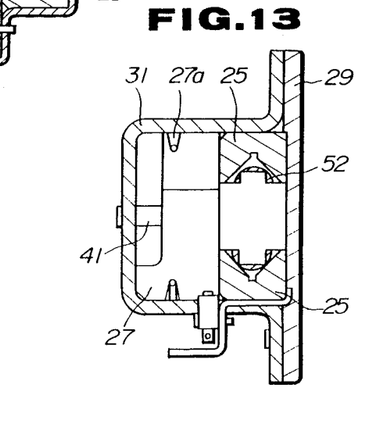
FIG. 13 is a sectional view taken along the line XIII—XIII of FIG. 4.
Figure 14:
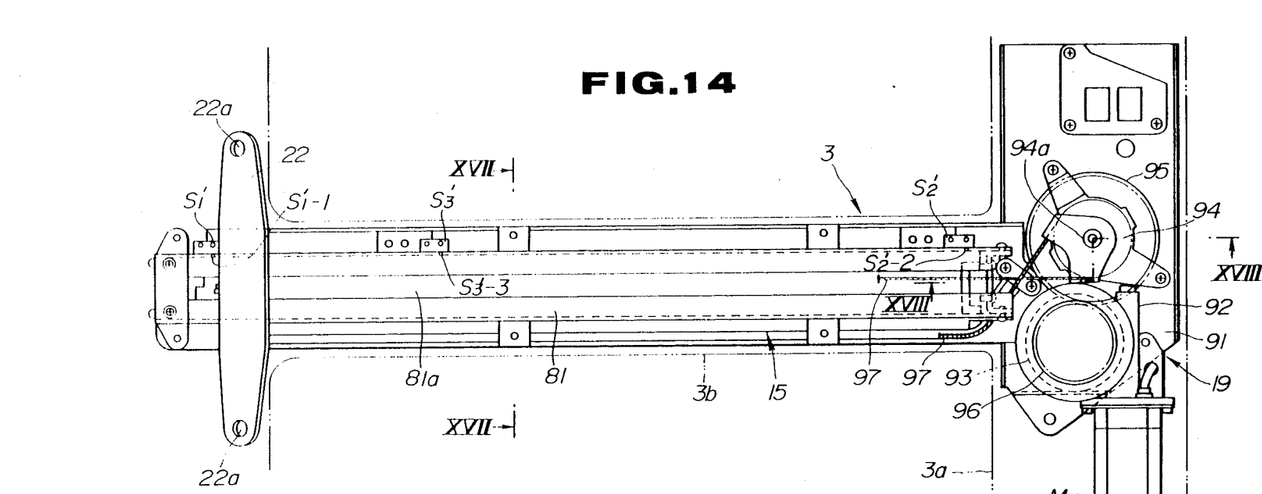
FIG. 14 is a plan view of an upper slide mechanism employed in the control device of the present invention, the mechanism being mounted on a T-bar roof of the vehicle.

Referring to FIGS. 13 and 14, there is shown the upper slide mechanism of the openable roof control device of the invention.

The guide member 15 is mounted on the center beam 3b of the T-bar roof construction 3 in a manner to extend along the same. The guide member 15 carries thereon the carrier plate 22 which is driven by the drive means 19.

Figures 16, 17, 18:
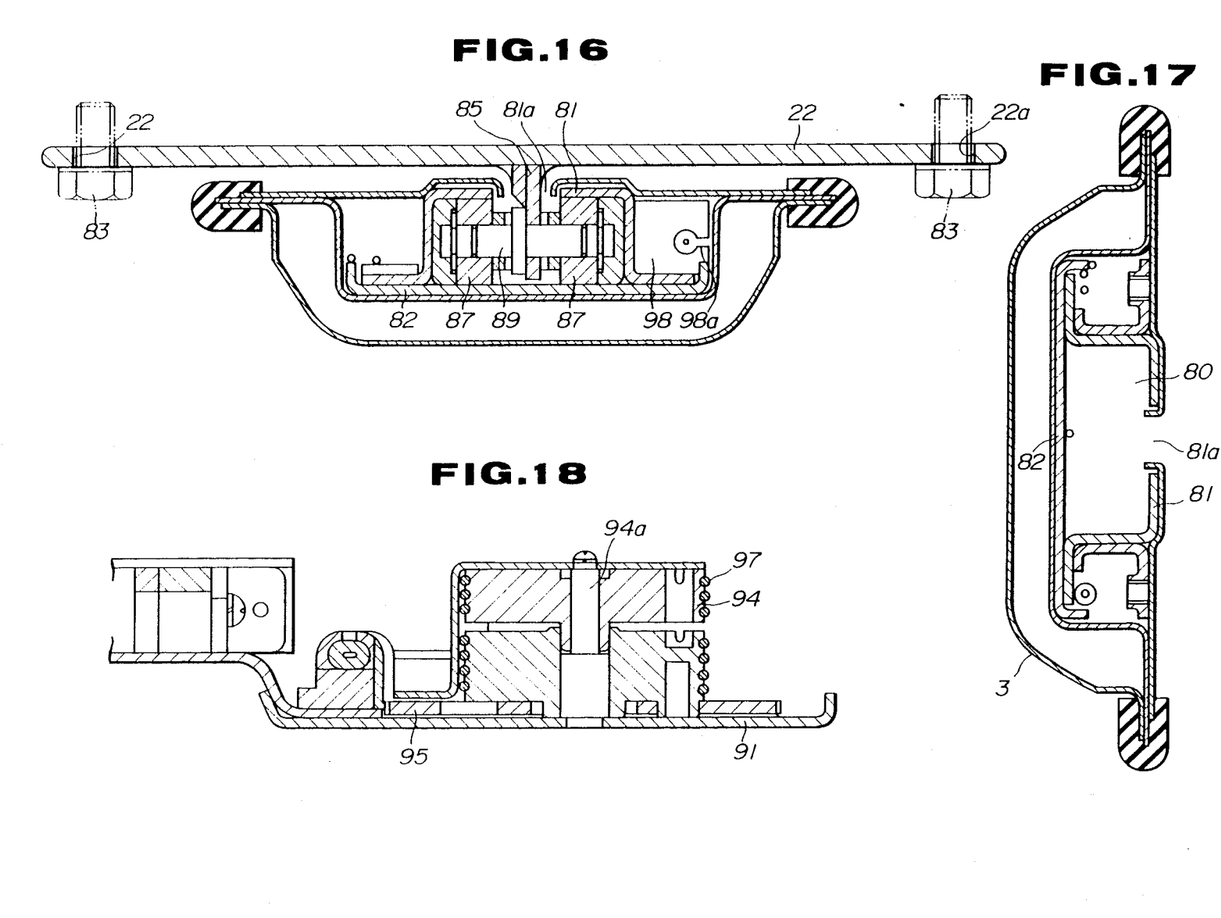
FIG. 16 is a sectional view taken along the line XVI—XVI of FIG. 15.
FIG. 17 is a sectional view taken along the line XVII—XVII of FIG. 14.
FIG. 18 is a sectional view taken along the line XVIII—XVIII of FIG. 14.

As is seen from FIG. 16, the guide member 15 comprises an outer rail 81 and an inner rail 82 which are combined to have an elongate hollow construction of a generally rectangular cross section. Thus, there is defined within the construction a guiding space 80. The outer rail 81 is formed with a longitudinally extending guide slot 81a. Similar to the case of the afore-mentioned side slide mechanism, a front part of the guide member 15 is smoothly inclined downward. That is, also in this upper slide mechanism, the guide member 15 comprises a horizontally extending major part and a downwardly inclined front part.

Figure 15:
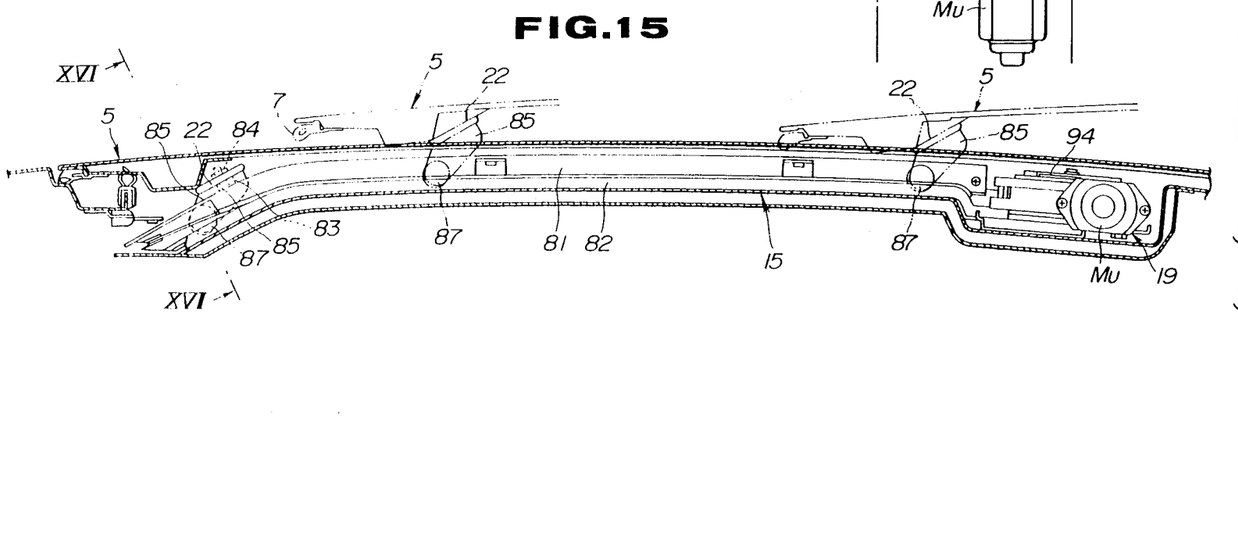
FIG. 15 is a side view of the upper slide mechanism of FIG. 14.

As is well shown in FIG. 14, the carrier plate 22 is of an elongate member, which is arranged perpendicular relative to the guide member 15. The carrier plate 22 has lateral both ends each having a mounting opening 22a. As is understood from FIGS. 15 and 16, the carrier plate 22 is secured, by means of bolts 83 and nuts 84 incorporated with the mounting openings 22a, to a front middle part of the openable roof 5. As is best seen in FIG. 16, the carrier plate 22 has at its middle part a runner 85 welded thereto and projected downward therefrom. The runner 85 extends through the guide slot 81a of the outer rail 81 into the guiding space 80 of the guide member 15 and carries two parallel rollers 87 and 87 through a shaft 89 secured thereto. The rollers 87 and 87 run along respective trucks defined along both sides of the guiding space 80, as shown. Thus, during forward and rearward movement of the openable roof 5, the rollers 87 and 8y run along the trucks in the same manner.

The electric motor $M_U$ which serves as the drive means 19 is of a reversable type, which is mounted to a base plate 91 (see FIG. 14) secured to the laterally extending reinforcing beam 3a of the T-bar roof construction 3. A worm 92 driven by the motor $M_U$ is meshed with a worm wheel 93 which is equipped with a drive gear 96. The drive gear 96 is meshed with a drum gear 95 of a wire winding drum 94. Thus, the wire winding drum 94 is rorated about its shaft 94a in one or the other direction in response to operation of the motor $M_U$.

A wire cable 97 is wound about the wire winding drum 94 having both ends released therefrom. One end of the wire cable 97 is connected to the carrier plate 22, while, the other end of the wire cable 97 is passed through a wire guide groove 98a of a guide body 98 (see FIG. 16) and connected to the carrier plate 22. The guide body 98 is connected to one side of the guide member 15.

Also, the motor $M_U$ is controlled by the above-mentioned manual switch which is mounted in a suitable portion of the vehicle.

As is seen from FIG. 14, first, second and third switches $S'_1$, $S'_2$ and $S'_3$ are mounted on the guide member 15, which control operation of the motor $M_U$.

The first switch $S'_1$ is mounted on the front end of the guide member 15 and becomes OFF condition when the openable roof 5 is brought into the full close position. That is, upon full closing of the roof 5, one of the the rollers 87 moved with the carrier plate 22 strikes against a detecting bar $S'_1$-1 of the switch $S'_1$ thereby to cause OFF condition of the swtich $S'_1$. Thus, the detecting bar $S'_1$-1 is placed on a travelling path described by the roller 87.

The second switch $S'_2$ is mounted on the rear end of the guide member 15 and becomes OFF condition when the openable roof 5 brought into its full open position. That is, upon full opening of the roof 5, one of the the rollers 87 moved with the carrier plate 22 strikes against a detecting bar $S'_2$-2 of the switch $S'_2$ thereby to cause OFF condition of the swtich $S'_2$. Thus, the detecting bar $S'_2$-2 is placed on a travelling path described by the roller 87.

The third switch $S'_3$ is mounted on a front portion of the guide member 15 and becomes OFF condition when the openable roof 5 is brought into a given slight open position during its opening movement. That is, upon the openable roof 5 coming to the given slight open position, the roller 87 moved with the carrier plate 22 strikes against a detecting bar $S'_3$-3 of the switch $S'_3$ thereby to cause OFF condition of the switch $S'_3$. Thus, the detecting bar $S'_3$-3 is placed on a travelling path described by the roller 87.

As will be understood from the above description, the first, second and third switches $S'_1$, $S'_2$ and $S'_3$ of the upper slide mechanism and the first, second and third switches $S_1$, $S_2$ and $S_3$ of each side slide mechanism are both arranged to assume OFF conditions when the openable roof comes to the full close position, the full open position and the predetermined slight open position, respectively.

In fact, the three third switches $S_3$, $S_3$ and $S'_3$ of the side slide mechanisms and the upper slide mechanism are used for determining the positions of the carrier plates 21 and 22 where dismounting and mounting of the openable roof 5 relative to the carrier plates 21 and 22 of these mechanisms can be achieved. That is, when the openable roof 5 is moved back to the slight open position, the same stops at the position due to function of these three third switches. Thus, the roof 5 is easily dismounted from the carrier plates 21 and 22. With this, the vehicle becomes an "Open Car". When the vehicle is in the shape of the Open Car, the carrier plates 21 and 22 are held at the foremost or rest positions. Of couse, re-mounting of the roof 5 to the plates 21 and 22 is easily carried out when, by manipulation of the manual switch, the plates 21 and 22 are brought to positions corresponding to the slight open position of the openable roof 5.

In the following, operation of the openable roof control device of the invention will be described.

Figure 21:
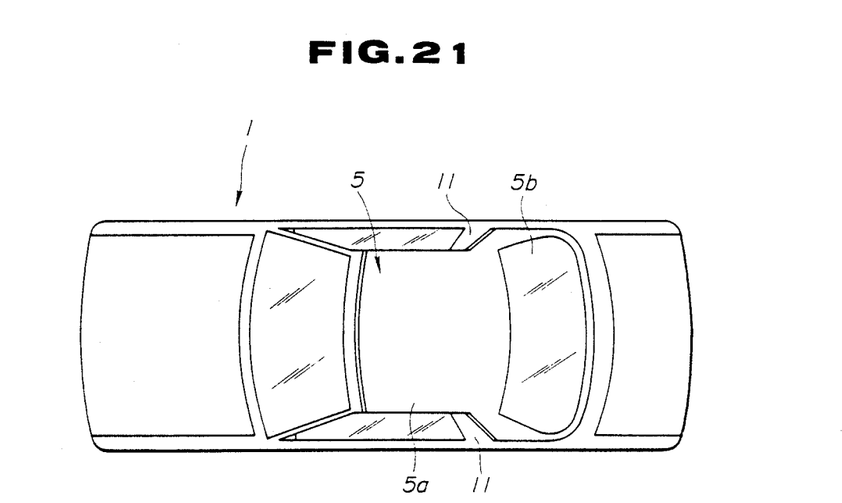
FIG. 21 is a plan view of the vehicle of FIG. 20.

For ease of understanding, the description will be commenced with respect to the full close condition of the openable roof 5 as shown in FIGS. 20 and 21. Under this condition, the first latch member 37 of the side mechanims is in latching engagement with the first engaging pin $P_1$ of the guide member 13 and the weather strip 7 of the roof 5 is sealingly pressed against the peripheral edge of the roof opening defined by the vehicle body.

When the manual switch is manipulated to energize the electric motors $M_S$ and $M_U$ to turn in one direction, the wire cables 79 and 97 are moved to pull the carrier plates 21 and 22 rearward. During an initial stage of this opening movement, the first latch member 37 (see FIG. 2) of the side slide mechanism is pivoted to release the first engaging pin $P_1$ and cause the front wall of the recess 61 thereof to abut against and thus push the stopper pin $P_3$ of the carrier plate 21. Thus, further movement of the wire cables 79 and 97 pulls the carrier plates 21 and 22 together with the roof 5 rearward along the downwardly inclined front parts of the guide members 13 and 15. Due to this movement, the weather strip 7 of the roof 5 is separated from the peripheral edge of the roof opening of the vehicle body.

Figure 22:
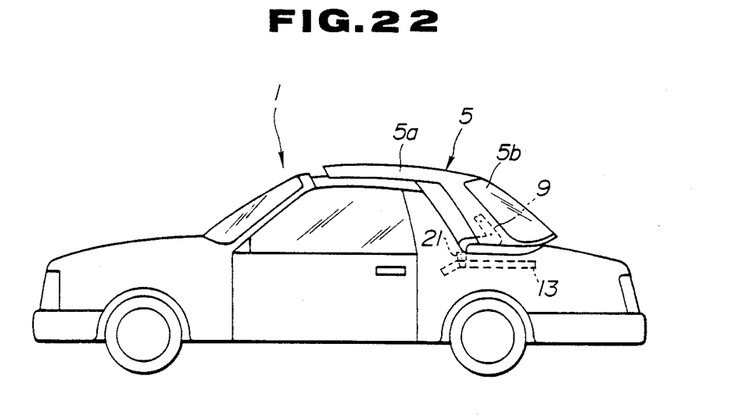
FIG. 22 is a side view of the vehicle in a condition wherein the openable roof is kept slightly opened.
Figure 23:
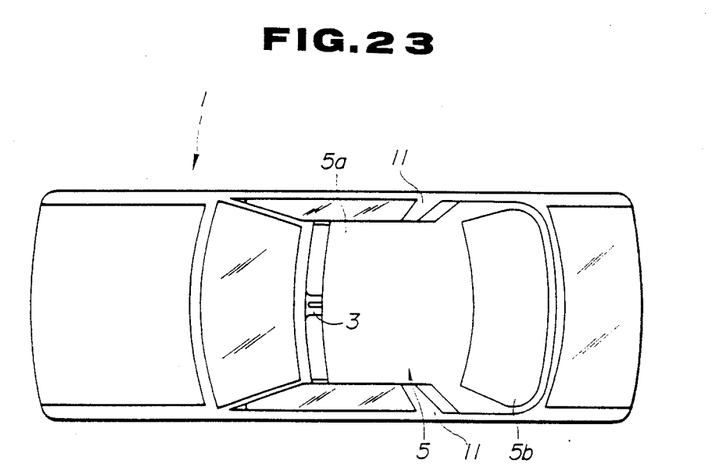
FIG. 23 is a plan view of the vehicle of FIG. 22.

When the roof 5 comes to the given slight open position, the same stops due to the work of the third switches $S_3$, $S_3$ and $S'_3$. This condition of the roof 5 is shown in FIGS. 22 and 23. Remanipulation of the manual switch brings about a further opening movement of the openable roof 5 toward the full open position.

Figure 24:
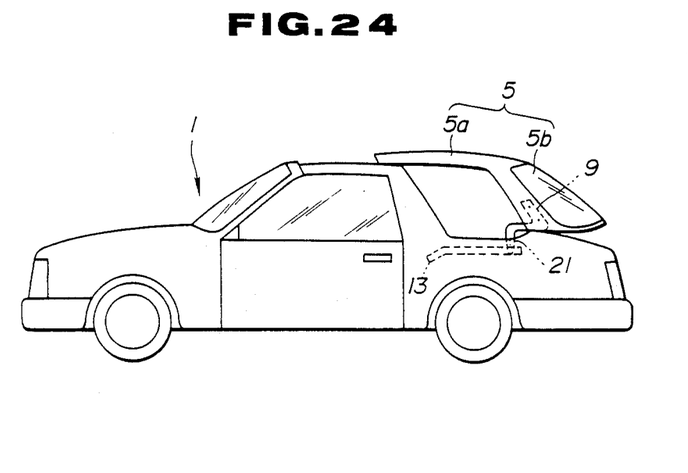
FIG. 24 is a side view of the vehicle in a condition wherein the openable roof is fully opened.
Figure 25:
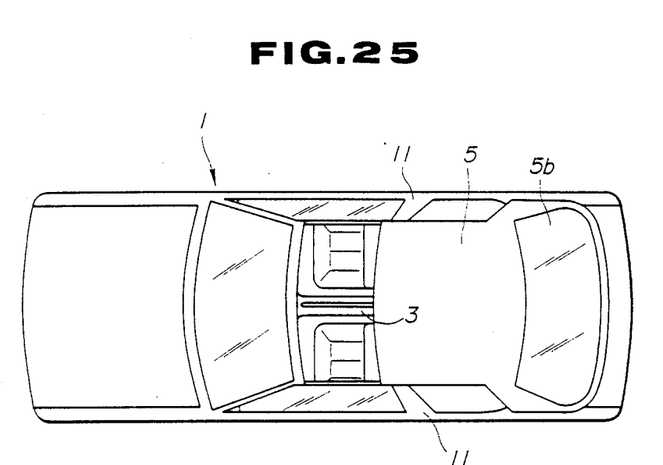
FIG. 25 is a plan view of the vehicle of FIG. 24.
Figure 26:
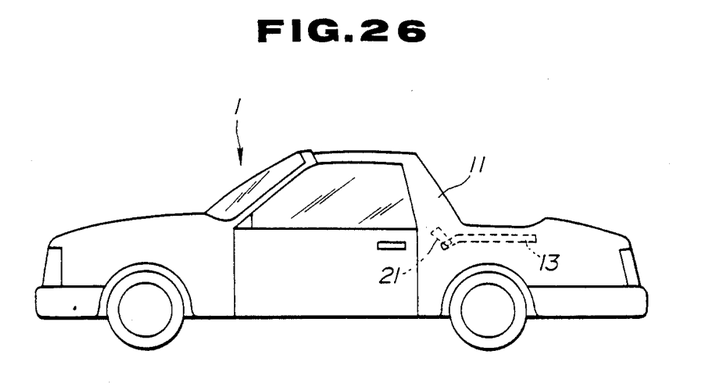
FIG. 26 is a side view of the vehicle in a condition wherein the openable roof is dismounted from the vehicle body.
Figure 27:
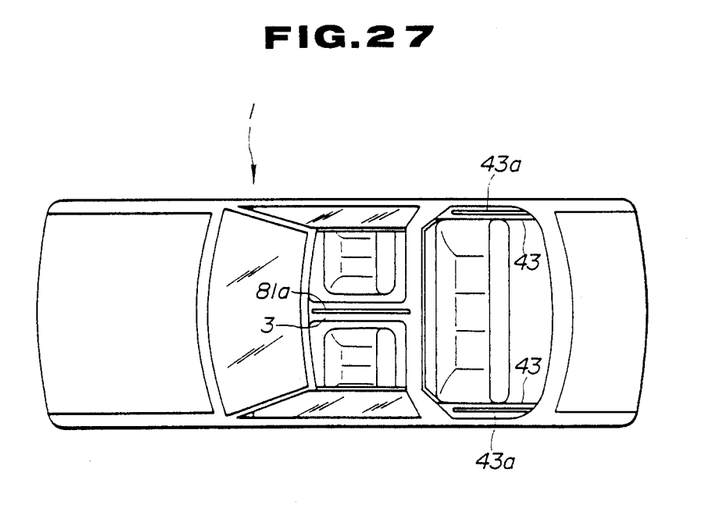
FIG. 27 is a plan view of the vehicle of FIG. 26.

When the roof 5 comes to the full open position, a smoothly curved shoulder portion (see FIG. 2) of the second latch member 39 is forced to ride over the second engaging pin $P_2$ against the biasing force of the spring 65 and thus the second latch member 39 becomes in latching engagement with the pin $P_2$. Upon this, the energization of the motors $M_S$ and $M_U$ stops. Thus, the roof 5 is safely latched at the full open position, as is shown in FIGS. 24 and 25.

When now the manual switch is manipulated to energize the electric motors $M_S$ and $M_U$ to turn in the other direction, the wire cables 79 and 97 are moved to pull the carrier plates 21 and 22 forward. During an initial stage of this closing movement, the second latch member 39 (see FIG. 2) is pivoted to release the second engaging pin $P_2$ and cause the rear wall of the recess 63 thereof to abut against and thus push the stopper pin $P_3$ of the carrier plate 21. Thus, further movement of the wire cables 79 and 97 pulls the carrier plates 21 and 22 together with the roof 5 toward the full close position.

When the roof 5 comes to the given slight open position, the same stops due to the work of the third switches $S_3$, $S_3$ and $S'_3$. Remanipulation of the manual switch brings about a further closing movement of the roof 5 toward the full close position.

When the roof 5 comes to the full close position, the first latch member 37 is brought into latching engagement with the first engaging pin $P_1$ and the energization of the motors $M_S$ and $M_U$ stops. Thus, the roof 5 is safely latched at the full close position, as is shown in FIGS. 20 and 21.

In order to dismount the roof 5 from the vehicle body 1, the roof 5 is moved to the given slight open position by manipulating the manual switch in the above-mentioned manner, and then the bolts and nuts 45 and 46 of the side slide mechanism (see FIG. 19) are disconnected and the bolts and nuts 83 and 84 of the upper slide mechanism (see FIG. 15) are disconnected. The disconnection of the bolts 45 and 46 (see FIG. 19) is carried out by inserting a suitable tool through the opening 43b of the housing 43. With this, the vehicle becomes an "Open Car". By manipulating the manual switch, the carrier plates 21 and 22 are moved to their foremost or rest positions, so that under this condition egress and ingress of passengers are not interrupted by them. As is described hereinabove, remounting of the roof 5 to the vehicle body 1 is carried out after the carrier plates 21 and 22 are moved to the positions which correspond to the given slight open position of the roof 5.

Because the openable roof control device of the present invention has the above-mentioned construction, the following advantages are expected.

First, because the openable roof is supported by the three slide mechanisms which are arranged on mutually spaced portions of the vehicle body, the sliding movement of the roof between the full close and full open positions is assuredly and reliably achieved without suffering a play.

Second, because of provision of the latch mechanisms, the openable roof at the full close or full open position can be assuredly latched to the vehicle body. This induces an assured sealing between contacting portions of the vehicle body and the openable roof.

Third, because the roof and the slide mechanisms are detachably connected by means of bolts and nuts in the afore-mentioned manner, dismounting and re-mounting of the roof relative to the vehicle body can be easily achieved.

What is claimed is:

1. In a wheeled motor vehicle having a slidably openable roof on a roof construction, an openable roof control device for controlling operation of said openable roof, which comprises:

three slide mechanisms arranged on mutually spaced portions of the body of said vehicle, one of said three-slide mechanisms being mounted on said roof construction and the other two of said three slide mechanisms being respectively mounted to laterally opposed sides of the vehicle body, each slide mechanism including a carrier device which carries thereon said openable roof for moving said openable roof between a full closed position and a full open position;

three electric actuators which are respectively connected to said three slide mechanisms for moving, when electrically energized, the carrier devices between positions corresponding to said full closed position of the openable roof and the other positions corresponding to said full open position of the openable roof;

latch means for latching at least two of said carrier devices relative to the vehicle body when said openable roof comes to one of said full closed and full open positions; and control means for controlling operation of said three electric actuators.

2. An openable roof control device as claimed in claim 1, in which each of said three slide mechanisms comprises a guide member which extends along a longitudinal axis of the vehicle and slidably carries thereon the carrier device.

3. An openable roof control device as claimed in claim 2, in which each of said guide members comprises a horizontally extending major part and a downwardly inclined front part.

4. An openable roof control device as claimed in claim 3, in which said latch means comprises at least two latch mechanisms mounted to the laterally opposed sides of the vehicle body.

5. An openable roof control device as claimed in claim 4, in which said at least two latch means each comprise a first latch means which latches the corresponding carrier device to the guide member when said openable roof comes to said full closed position, and a second latch means which latches the corresponding carrier device to the guide member when said openable roof comes to said full open position.

6. An openable roof control device as claimed in claim 5, in which said first latch means comprises a first latch member pivotally connected to the corresponding carrier device, a first engaging pin connected to a front end of said guide member and biasing means for biasing said first latch member to turn in a given direction, and in which said second latch means comprises a second latch member pivotally connected to the corresponding carrier device, a second engaging pin connected to a rear end of the guide member and biasing means for biasing said second latch member to turn in a given direction.

7. An openable roof control device as claimed in claim 6, in which each of the three electric actuators comprises an electric motor, a wire winding drum driven by said electric motor, and a wire cable wound on said wire winding drum, said wire cable having both ends connected to the corresponding carrier device, so that upon energization of the motor, said wire cable is moved to drive said carrier device along said guide member.

8. An openable roof control device as claimed in claim 7, in which one end of the wire cable of each of said other two slide mechanisms is connected to one of said first latch members and the other end of said wire cable is connected to a corresponding one of said second latch members.

9. An openable roof control device as claimed in claim 8, in which each of said other two slide mechanisms further comprises a stopper pin which is secured to a base portion of corresponding carrier device for suppressing excessive pivotal movement of said first and second latch members.

10. An openable roof control device as claimed in claim 9, in which said control means of each of said three slide mechanisms includes first, second and third switches, one of said switches of each of said three slide mechanisms being arranged to stop energization of the corresponding electric motor when said openable roof comes to a given slight open position.

11. In a wheeled motor vehicle having a slidably openable roof on a roof construction, an openable roof control device for controlling operation of said openable roof, which comprises:
  a pair of side slide mechanisms respectively mounted to laterally opposed sides of the body of said motor vehicle, each side mechanism including a first guide member which is secured to the side of the body to extend along a longitudinal axis of the vehicle, a first carrier device which is movable along said guide member between first and second given positions and is detachably connected to a portion of said openable roof, first means which latchingly engages said carrier device relative to said guide member when said carrier device comes to said first given position, and second means which latchingly engages said carrier device relative to said guide member when said carrier device comes to said second given position;
  an upper slide mechanism mounted on said roof construction, said upper mechanism including a second guide member which is secured to said roof construction to extend along the longitudinal axis of the vehicle, and a second carrier device which is movable along said second guide member and is detachably connected to another portion of said openable roof;
  a first electric actuator for moving said first carrier device of each side slide mechanism along said first guide member between said first and second given positions;
  a second electric actuator for moving said second carrier device of said upper slide mechanism along said second guide member; and
  control means for controlling operation of said first and second electric actuators.

12. An openable roof control device as claimed in claim 11, in which said first carrier device of each side slide mechanism comprises:
  a holding plate;
  two rollers rotatably connected through respective shafts to said holding plate, said rollers running along a truck defined by said first guide member; and
  a carrier plate pivotally supported by one of said shafts of the rollers, said carrier plate having one end detachably connected to a portion of said openable roof.

13. An openable roof control device as claimed in claim 12, in which said first means of each side mechanism comprises a first latch member pivotally supported by the selected one of the shafts of the rollers, a biasing spring for biasing said first latch member to turn in a given direction, and a first engaging pin secured to a front end of said first guide member, whereby when said first carrier device is brought to the front end of said first guide member, said first latch member is brought into latching engagement with said first engaging pin.

14. An openable roof control device as claimed in claim 13, in which said second means of each side slide mechanism comprises a second latch member pivotally supported by the selected one of the roller shafts, a biasing spring for biasing the second latch member to turn in a given direction, and a second engaging pin secured to a rear end of said first guide member, whereby when said first carrier device is brought to the rear end of said first guide member, said second latch member is brought into latching engagement with said second engaging pin.

15. An openable roof control device as claimed in claim 14, in which said first and second latch members are each formed with a recess into which a stopper pin extending from said carrier plate is projected.

16. An openable roof control device as claimed in claim 15, in which each of said first and second electric actuators comprises an electric motor, a wire winding drum driven by said electric motor, and a wire cable wound on said wire winding drum, said wire cable having both ends connected to the corresponding carrier device from opposed directions, so that upon energization of the motor, said wire cable is moved to drive said carrier device along the corresponding guide member.

17. An openable roof control device as claimed in claim 16, in which one end of the wire cable is connected to said first latch member and the other end of said wire cable is connected to said second latch member.

18. An openable roof control device as claimed in claim 17, in which each of said side slide mechanisms further comprises a stopper pin which is secured to said carrier plate of said carrier device for suppressing excessive pivotal movement of said first and second latch members.

19. An openable roof control device as claimed in claim 18, in which said control means of each of said slide and upper mechanisms comprises first, second and third switches, one of said switches of each said side and upper mechanisms being arranged to stop energization of the corresponding electric motor when said openable roof comes to a given slight open position.

20. An openable roof control device as claimed in claim 12, in which said first guide member comprises upper and lower guide rails which have at their facing portions guide grooves of generally V-shaped cross section, said guide grooves receiving therein said two rollers of said carrier device.

* * * * *